Dec. 20, 1966   C. GALLONE   3,292,652
HIGH VACUUM TIGHT ROTARY VALVE
Filed Dec. 30, 1963
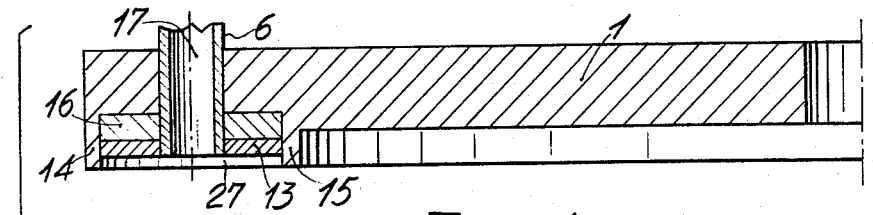
FIG. 1
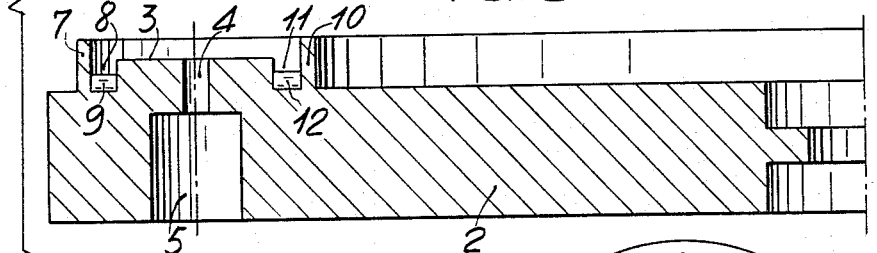
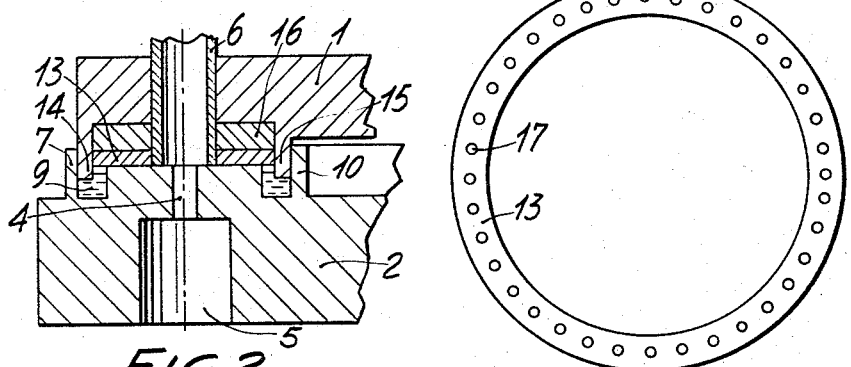
FIG. 2   FIG. 3
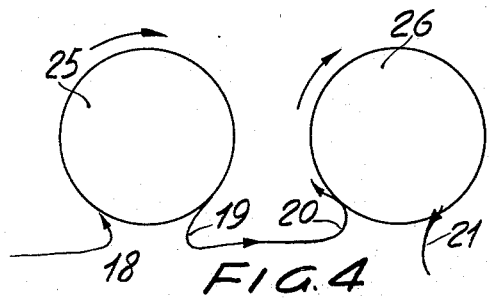
FIG. 4
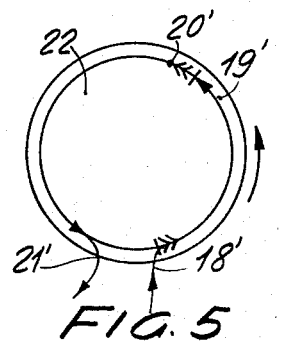
FIG. 5
INVENTOR.
CESARE GALLONE
BY Irvin S. Thompson
ATTORNEY

United States Patent Office 3,292,652
Patented Dec. 20, 1966

3,292,652
HIGH VACUUM TIGHT ROTARY VALVE
Cesare Gallone, Via Pellico 25, Settimo Milanese
(Milan), Italy
Filed Dec. 30, 1963, Ser. No. 334,490
Claims priority, application Italy, Dec. 31, 1962,
Patent 680,784
3 Claims. (Cl. 137—246)

It is the object of the present invention to provide an automatic machine for producing electric lamp bulbs, provided with a high vacuum tight valve, whereby it is possible to produce in a single operating cycle the forming, emptying and gas filling of electric incandescent or gas discharge lamp bulbs. According to the invention, the vacuum tight valve surface has an annular shape and is placed between the stationary upper plate and the lower, rotatable, head-carrying plate; said surface maintain the high vacuum seal between these two plates. The upper plate, carrying the vacuum or pressure taps for any wanted gas, has, adjacent to its periphery a grooved annular seat, wherein protrude the rigid small pipes connected to the vacuum and/or compressed gas headers, and wherein are received two sealing rings. The upper ring is made of a resilient material, such as for instance rubber, neoprene or the like, and acts as an elastic bearing for the lower ring. The lower ring is made of a plastic material having a low friction factor, a good mechanical strength, a good heat resistance, and a low porosity; it helps in keeping, a hermetic seal against the ground annular surface of the lower head-carrying, rotatable plate. The two sealing rings are kept in place by the lower ends of the above mentioned small rigid pipes, and by the side walls of the annular groove. The outer walls of the groove form respectively two protruding edges dipping in two annular channels for the oil, provided on the lower head-carrying, rotatable plate. These annular channels are delimited by two edges protruding upwardly from the lower plate, embracing inside and outside the hardened ground metallic annular surface of the coresponding edges extending from the upper plate.

In the machines for emptying and gas filling of electric lamp bulbs, the problem of a high vacuum tight seal, between the upper stationary plate, and the lower, head-carrying, rotatable plate, has always been a difficult one to solve. And this because the vacuum to be produced is a very high one, because one of the valve surfaces is movable relative to the other, because the valve surface is very large, and because a part of the valve gets warm and therefore has a tendency to warp. Until to date, in these types of machines the vacuum tight sealing was obtained by fabricating the two plates from special hardened steel, and letting them age for months; the plates were then ground to high degree of accuracy, and finally were made to rotate for a long time one over the other.

In spite of all these expensive steps the plates, in the case of a large size valve, such as is required in a single automatic unit for forming the glass bulbs, and their successive air emptying and gas filling for electric lamps, could not insure, during their operation, a good sealing. And this because of the elastic deformations due to the mechanical tightening, and because of the deformations due to the uneven heating of the plate itself.

It is the object of the present invention to prevent all of the inconveniences mentioned and therefore to obtain, at a low cost, a high vacuum tight sealing, lasting under any operating condition. It is now possible to obtain all these advantages by placing in contact with an annular track of the lower plate, a plastic material ring, pressed by another plastic material ring. The lower plate and the upper plate can be comprised of standard mild steel and can be work-finished immediately after forging, that is without any ageing period. Their limit of accuracy can be, for most of their surfaces, rough, and the only part that has to be ground is the annular flat surface, eventually chrome plated with a remarkable thickness, of the lower plate, on which slides and keeps the seal the plastic material ring. All these advantages help definitively in lowering the plates and therefore the machine costs and in simplifying the setting up and the maintainance of the machine itself. The present invention enables a radical transformation in the field of the automatic machines for the production of incandescent and gas-discharge electric lamps. Indeed, to date the whole cycle was performed with two machines, one for forming the lamp bulbs, and another one for air emptying and gas filling the bulbs. Attempts were made to place a machine as close as possible to the complementary machine, and in some cases one went as far as mounting the two machines on the same bed plate, so that at first glance they might look as a single machine. Actually the machines were always two, even if mechanically connected to one another, inasmuch as the formed bulbs had to be transferred to the other machine for being air emptied and filled with gas. The fact of being two different machines was evident even when the transfer of the bulbs from the first to the second machine was carried out, instead of by hand, by means of an automatic conveyor system. The separation of the two machines was indispensable in order to prevent the heating of the two ground plates that had to keep the vacuum seal.

The radical transformation made now possible by the present invention consists in the fact that a single machine can now perform the manufacturing, the air emptying and the gas filling of the lamp bulbs. Therefore the lamp socket heads are inserted in the opposite seats of the lower plate, which upon turning intermittently allows the complete finishing of the lamp bulbs. This is made possible thanks to the rotary valve in question, perfectly operating even if the two plates, the stationary one and the rotatable one, are subject to deformations due to their uneven heating, because of the burner flames placed under that portion of their sealing periphery that is destined to the glass forming.

Referring to the attached drawing, there will now be described more in detail one of the possible forms of practicable embodiment of the invention, merely in the way of an example.

FIGURE 1 shows a section of one-half of the rotary high vacuum tight valve for an automatic machine that, in a single working cycle, allows to form, to exhaust the air from, and to fill with gas, incandescent and gas discharge lamp bulbs. In said machine, the upper plate is shown somewhat apart from the lower rotatable plate, in order to make better visible the different parts.

FIGURE 2 is a detail showing the rotary high vacuum tight valve, assembled and in operating position, what is obtained by bringing in contact together the two plates and by fitting together the protruding edges.

FIGURE 3 shows the shape of the plastic material packing and of the resilient ring, which both have the same shape.

FIGURE 4 illustrates schematically the working cycle performed by two machines according to earlier practice, and FIGURE 5 illustrates diagrammatically the working cycle as performed with a single machine provided with the rotary valve being the object of the present invention.

In these figures there can be noted the upper stationary plate 1, and the lower, rotatable head-carrying plate 2. These plates, besides of hard material, can be made of standard mild steel, merely rough-milled, the only ground part being the annular flat surface 3. If it is wanted that said annular surface 3 be hard, before grinding, it is covered through a known plating process, with a chrome coating. The annular flat ground surface 3 lies along the periphery of the upper side of the rotatable plate 2. By means of a series of holes 4, which in the example shown are thirty-six, but can be more or less numerous, every seat 5 for the lamp socket head is made to communicate with the rigid (stiff) small pipe 6, terminating at the vacuum or compressed gas headers. The annular track 3 is outwardly surrounded by the vertical edge 7, concentrical to same, which limits an annular channel 8 to contain the oil 9. The track 3 itself has even inwardly an edge 10, concentrical with same, that limits a channel 11 to contain the oil 12. The oil in the annular grooves 8 and 11 serves for lubricating the track 3 and the ring 13, and for sealing the valve. The upper plate 1 over its periphery has a vertical edge 14, facing downwards, and concentrical to same has another vertical edge 15, also facing downwards. When the valve is assembled, the edges 14 and 15 fit respectively between the edges 7 and 10 in the grooves 8 and 11 of the lower plate, dipping in the oil 9 and 12. Between the edges 14 and 15 there is provided an annular recess 27, that receives at its bottom the resilient material ring 16. This ring can be made of rubber, neoprene, and the like. In contact with said ring 16, there is mounted the ring 13, made of a plastic material having the properties of a low friction factor, a good mechanical strength, a good heat resistance, and a low porosity. Good results have been obtained, for instance, with plastic materials based on tetrafluoroethylene (Teflon) or based on polyamidic resins (nylon), polyethylene, and the like. Both the ring 16 and the ring 13 have a width equal to that of the recess encompassed by the edges 14 and 15, and have therein holes as 17, equal in number and diameter, to the small pipes 6. The ring 16 serves to compensate the deformations of the planes of the track 3 and of the ring 13, due to the elastic deformations by effect of the tightening, and to the uneven heating of the head-carrying plate 2, caused by the heat from the flames allowing the forming of the lamp bulbs. With the known machines the lamp bulbs were loaded at the point 18 (FIGURE 4) on the rotatable plate 25, from which they were discharged fully formed in 19, wherefrom they were transferred on the rotatable plate 26 in 20, and were delivered in 21, air emptied and eventually gas filled. With the machine provided with the valve according to the present invention, the lamp is loaded in 18', on the rotatable plate 22, whereon it is being formed upon reaching point 19', and where the air is exhausted and then the bulb filled with gas in travelling from point 20' to point 21'.

What has made possible the embodiment of this important improvement has been the coupling of two sealing packings, a resilient one, and the other with a low friction factor, and their placing in an annular groove without play, with the addition of the rigid small pipes 6 so as to prevent any deformation in a radial direction, and to take maximum advantage of the different properties of the two sealing rings. Indeed, a single plastic material packing, with a low friction factor, although giving good results in rotary valves of small size or evenly heated, does not set nor compensate the deformations of the sealing surfaces caused by the tightening of the plates one against the other, and by uneven and expansions.

What is claimed is:

1. A high-vacuum-tight valve for an automatic machine that produces electric lamps by forming and evacuating and gas filling the lamps, comprising a stationary plate having a plurality of apertures therein, a rotatable plate having a plurality of conduits and communicating chambers therein, a sealing valve between the stationary plate and the rotatable plate including a groove-shaped annular track in said stationary plate, two annular packing rings received in the groove-shaped annular track without radial clearance, one said ring being against the bottom of said track and being made of soft rubber or the like and the other said ring being disposed toward the outside of the track and being at least semi-rigid and having anti-friction and self-lubricating properties, a plurality of small rigid pipes in said apertures of said stationary plate, said pipes forcing said rings peripherally tight in the track and keeping them stationary, said pipes extending into the track and passing perpendicularly through the two packing rings, said pipes and the walls of the track serving to keep said rings in place and to prevent radial expansion of the rings during heavy pressure applied between said plates and insuring a gas-tight seal between said stationary plate and said conduits and said chambers of said rotatable plate.

2. A valve as claimed in claim 1, in which the walls of said annular track have the shape of cylindrical ribs and protrude beyond said rings, the rotatable plate having an annular track integral with said rotatable plate, two annular cylindrical ribs extending from the rotatable plate and forming two annular grooves disposed on opposite sides of said rotatable plate annular track, the inside diameter of said two annular cylindrical ribs being the same as that of the outside of the first-named ribs of the stationary plate so as to interfit therewith to form a gas-tight labyrinth.

3. A valve as claimed in claim 2, in which said two annular grooves contain a lubricating liquid to increase the sealing capacity.

References Cited by the Examiner

UNITED STATES PATENTS

| | | | |
|---|---|---|---|
| 913,575 | 2/1909 | Sprague | 85—1 |
| 2,918,938 | 12/1959 | Kimball | 137—246.22 X |
| 2,967,539 | 1/1961 | Bradbury | 137—246 |

WILLIAM F. O'DEA, *Primary Examiner.*